United States Patent
Reitmeier et al.

(10) Patent No.: US 11,483,529 B2
(45) Date of Patent: Oct. 25, 2022

(54) NORMALIZED HIGH-DYNAMIC RANGE VISUALIZATION

(71) Applicant: NBCUniversal Media, LLC, New York, NY (US)

(72) Inventors: Glenn A. Reitmeier, Yardley, PA (US); Arley Christopher Seeger, Rockville Centre, NY (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

(21) Appl. No.: 16/661,834

(22) Filed: Oct. 23, 2019

(65) Prior Publication Data

US 2021/0127102 A1    Apr. 29, 2021

(51) Int. Cl.
| | |
|---|---|
| *H04N 9/68* | (2006.01) |
| *H04N 9/77* | (2006.01) |
| *H04N 17/02* | (2006.01) |
| *H04N 5/202* | (2006.01) |
| *H04N 5/91* | (2006.01) |

(52) U.S. Cl.
CPC ............... *H04N 9/68* (2013.01); *H04N 5/202* (2013.01); *H04N 5/91* (2013.01); *H04N 9/77* (2013.01); *H04N 17/02* (2013.01)

(58) Field of Classification Search
CPC ............ H04N 9/68; H04N 9/77; H04N 5/202; H04N 5/91; H04N 17/02
USPC .......................................... 348/645; 382/162
See application file for complete search history.

(56) References Cited

U.S. PATENT DOCUMENTS

| | | | |
|---|---|---|---|
| 8,249,540 B1* | 8/2012 | Gupta | H04B 1/10 455/305 |
| 11,134,300 B2* | 9/2021 | Takagi | H04N 5/93 |
| 2018/0152721 A1* | 5/2018 | Rusanovskyy | H04N 19/46 |
| 2018/0336669 A1* | 11/2018 | Mertens | H04N 5/265 |
| 2019/0246043 A1* | 8/2019 | Gunji | H04N 5/23248 |
| 2019/0370596 A1* | 12/2019 | Ando | G06T 5/40 |
| 2020/0029096 A1* | 1/2020 | Rusanovskyy | H04N 19/52 |

* cited by examiner

*Primary Examiner* — John W Miller
*Assistant Examiner* — Omer Khalid
(74) *Attorney, Agent, or Firm* — Fletcher Yoder, P.C.

(57) ABSTRACT

A tangible, non-transitory machine-readable medium includes machine-readable instructions that, when executed, cause processing circuitry to receive a signal indicative of high dynamic range content. The signal includes 1) a first portion that forms a first percentage of the signal and is associated with a first brightness range and 2) a second portion that forms a second percentage of the signal associated with a second brightness range. The instructions, when executed, are also configured to cause the processing circuitry to produce an adjusted signal to represent the signal such that a graphical representation of the adjusted signal includes an area corresponding to the first portion of the signal that is expanded relative to a graphical representation of the first portion of the signal. Furthermore, the instructions, when executed, are configured to cause the processing circuitry to cause display of a graphical representation of the adjusted signal.

20 Claims, 5 Drawing Sheets

NORMALIZED HIGH-DYNAMIC RANGE VISUALIZATION

BACKGROUND

The present disclosure relates generally to high-dynamic range (HDR) content. More particularly, the present disclosure relates to normalizing HDR content for display and analysis via electronic devices such as waveform monitors.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various electronic devices may be utilized to monitor and review video content. For example, waveform monitors may measure the voltage of a video signal over time and display an indication of the measured voltage. In essence, a traditional waveform monitor is a oscilloscope that is triggered synchronously with one or more scan lines of the video raster that represent a frame or field of the video signal. For example, optical data (e.g., image data) may be represented using electrical units, such as volts, by converting the optical data using an optical transfer function. The measured voltage may be indicative of a brightness (e.g., luminance) of an image or frame of video content. Additionally, for a color difference signal (e.g., Cr or Cb component signals), the measured voltage may be indicative of the color saturation on. Data presented on waveform monitors may also be used for production purposes, such as to adjust lighting on a set or to set camera iris and exposure.

Traditionally, video content, such as television and films, was standard-dynamic range (SDR) video content having a dynamic range based on cathode ray tube (CRT) display technology. For example, brightness of SDR video content may range from approximately 0 to 100 nits, where nits are units of luminance (1 nit is defined as 1 candela/square meter). When reviewing video signals of SDR video content, a graphical representation of the signal may be presented on a display of a waveform monitor, and the graphical representation can often occupy large amounts of the display. In other words, the distribution of video data in a typical scene (or a test pattern) may be spread out across the display and readily visible and interpretable. However, with the advent of other forms of video content, such as HDR video content, the range in brightness can be many times greater, though much of the content may be concentrated within a relatively small portion of the range. Due to the larger range, when video signals for HDR video content are presented on a waveform monitor, graphical representations of the signals may occupy only a small portion of the display when the display is designed to facilitate the interpretation of video signals from SDR content.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

The current embodiments relate to techniques for normalizing and monitoring different types of HDR content (e.g., HDR videos). For example, the current embodiments relate to a content monitoring system that may receive HDR content (e.g., a video signal indicative of HDR content) and generate measurement feedback regarding the HDR content. The content monitoring system may include a waveform monitor that modifies (e.g., normalizes) the received signal to generate an HDR adjusted monitoring output. The waveform monitor may display a graphical representation (e.g., a waveform) of the HDR adjusted monitoring content, which may provide users with information relating to characteristics of the HDR content.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. To provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As set forth above, HDR video content has a wider range of brightness relative to SDR content. In other words, HDR content has a larger contrast ratio. For example, brightness of SDR video content may range from approximately 0 to 100 nits, while HDR content may range from approximately 0 to 10,000 nits. When electronic devices such as waveform monitors are utilized to analyze video signals for SDR content, graphical representations of the video signals may be relatively visible and interpretable due to the SDR content having a relatively small dynamic range. However, because HDR content has a larger dynamic range than SDR content, when graphical representations of video signals for HDR content are provided (e.g., on devices designed to display SDR dynamic ranges), they may appear compressed into a narrow vertical range of the display, which may make it exceedingly difficult to analyze or interpret the graphical representations. Furthermore, manually adjusting outputs from waveform monitors associated with HDR content and/or waveform monitor settings associated with processing HDR content can lead to inconsistent graphical representations. For instance, multiple HDR standards exist. Thus, engineers or technicians may need to use different settings for each standard, some of which may be subjectively selected. For example, different users may classify portions of the HDR content and/or weight the portions of the HDR content differently, which may cause inconsistent graphical representations.

As discussed below, the present application is directed to techniques that provide normalized graphical representations of HDR content. For example, an HDR video signal may be adjusted so that a waveform or other graphical representation of the HDR video signal is readily viewable and interpretable when presented on a waveform monitor. Furthermore, by providing HDR normalized graphical representations, the techniques discussed herein greatly reduce and/or eliminate human subjectivity associated with generating graphical representations (e.g., waveforms) of HDR content using a waveform monitor. For instance, the techniques described herein may enable normalized graphical representations for different types of HDR content (e.g., content generated using different HDR standards) without user-defined ranges within the HDR content.

Figure 1:
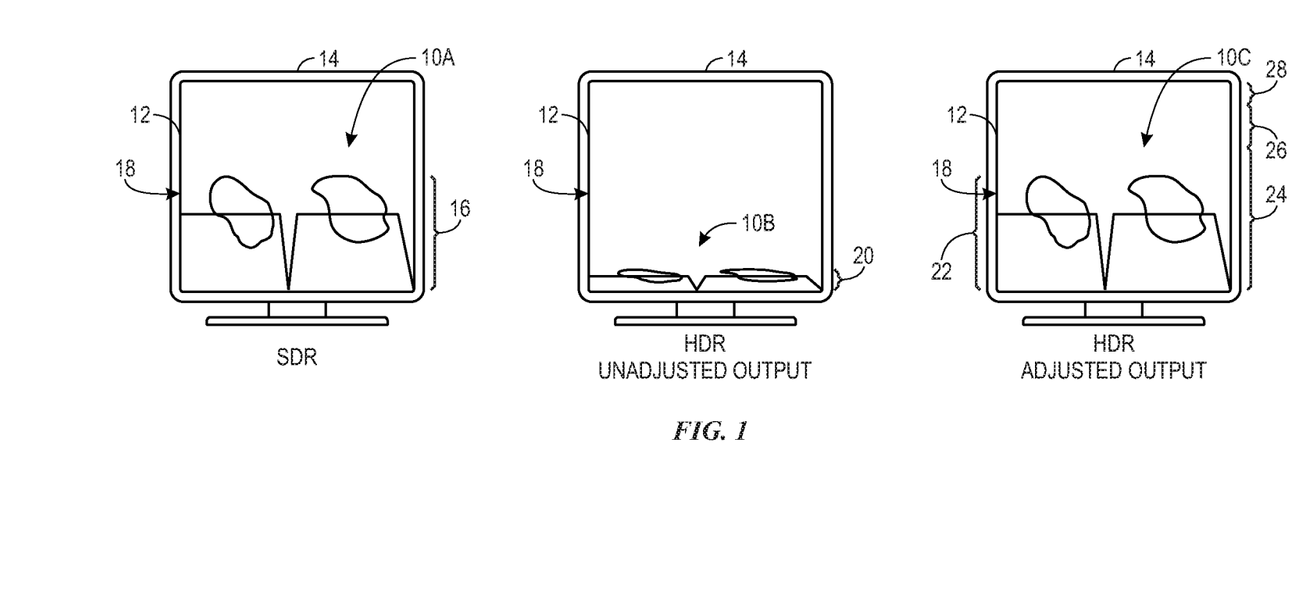
FIG. 1 illustrates content that may be displayed on the display of a waveform monitor, in accordance with an embodiment of the present disclosure.

With the foregoing in mind, FIG. 1 illustrates several waveforms 10A, 10B, 10C that may be presented, for example, on a display 12 of a waveform monitor 14. The waveforms 10A, 10B, 10C may be representative of brightness levels or color in a video signal. For example, different colors or brightness intensities may be represented at different positions of a vertical axis 16 of the waveforms 10A, 10B, 10C over time (represented by horizontal axis 17). A first waveform 10A is representative of a video signal of SDR content. Based on a displayed positioning of the waveform 10A on the display 12, engineers or technicians may be able to readily interpret the waveform 10A. For example, as noted above, the waveform 10A may be indicative of colors in a video signal. As depicted, the first waveform 10A occupies a portion 18 of the display 12. As discussed above, SDR provides a smaller dynamic range than HDR. For example, SDR content may range from 0 to 100 nits. Accordingly, due to the relatively narrow range provided by HDR, the waveform 10A occupies the portion 18 of the display 12. In other words, each one-hundredth of a vertical axis 16 of the display 12 may be associated with a portion of the waveform 10A that corresponds to a particular brightness (e.g., a particular number of nits).

Due to the wide range provided by HDR, waveforms associated with HDR content may occupy a smaller portion of the display 12 (e.g., because the range represented on an axis of the display 12 may be significantly larger). As noted above, HDR offers a wider dynamic range. For example, in some cases, HDR content may range from 0 to 10,000 nits or values even greater than 10,000 nits. As an example, in the case of HDR ranging from 0 to 10,000 nits, each ten-thousandth of the vertical axis 16 of the display 12 may be associated with a different brightness compared to each one-hundredth of the vertical axis 16 when presenting a waveform associated with SDR content, such as the waveform 10A.

Waveform 10B is an unadjusted output generated by the waveform monitor 14 from an HDR video signal. As illustrated, the waveform 10B occupies a portion 20 of the display 12 that is much smaller than the portion 18 associated with the waveform 10A. Due to the waveform 10B only occupying the portion 20 of the display 12, the waveform 10B can be very difficult to interpret. Moreover, much of the display 12 is not utilized for displaying the waveform 10B.

As discussed herein, the waveform monitor 14 may produce an HDR adjusted output, which is depicted as waveform 10C. In other words, the waveform monitor 14 may receive an HDR video signal, process the HDR signal, and generate the waveform 10C. The waveform 10C may occupy a portion 22 of the display 12 that is larger than the portion 20 and similar in size to the portion 18. Additionally, discussed below, various portions of the vertical axis 16 of the display 12 may be utilized to provide graphical representations for certain portions of a video signal. For example, portion 24 may be associated with one portion of the signal, portion 26 may be associated with another portion of the video signal, and portion 28 may be associated with yet another portion of the signal. By adjusting how graphical representations, such as waveforms, are generated and displayed, the waveform monitor 14 may provide graphical representations like waveform 10C that are interpretable and uniform for different types of HDR content. In some instances, the portion 26 may correspond to a greater nit range than the portion 24 even though the portion 24 is larger than the portion 26. In some respects, this is because portion 24 may represent a greater portion of the video signal than the portion 26.

Figure 2:
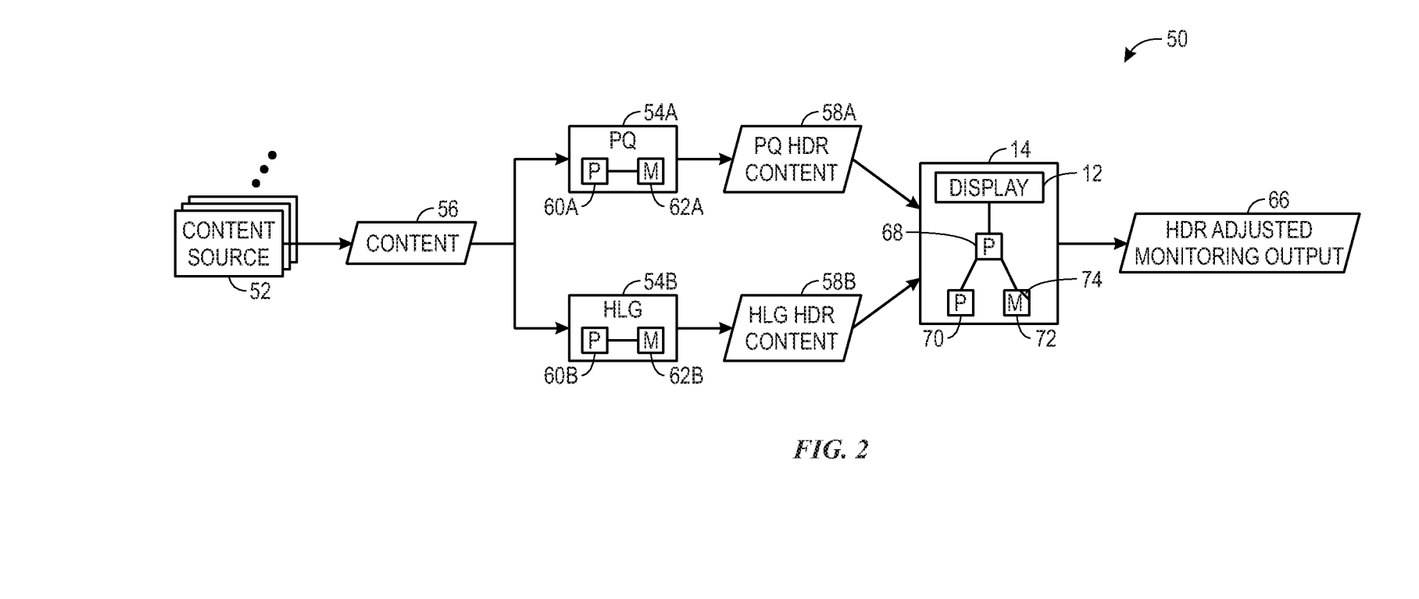
FIG. 2 is a schematic diagram of a content monitoring system, in accordance with an embodiment of the present disclosure.

Continuing with the drawings, FIG. 2 is a schematic diagram of a content monitoring system 50 that includes one or more content sources 52, HDR content generators 54, and the waveform monitor 14. The content sources 52 may be electrical devices that capture content 56 (e.g., SDR video content), store the content 56, or a combination thereof. For example, the content sources may include cameras, one or more non-volatile memory devices capable of storing the content 56, or a combination thereof. The content source 52 may be communicatively coupled to one or more HDR content generators 54A and 54B (herein referred to collectively as content generators 54).

The HDR content generators 54 receive the content 56 from the content sources 52 and generate HDR content 58, such as HDR video content. Each of the HDR content generators 54 depicted in FIG. 2 is associated with a different HDR standard. For instance, a Perceptual Quantizer (PQ) HDR content generator 54A may generate PQ HDR content 58A in accordance with the Society of Motion Picture and Television Engineers (SMPTE) standard ST 2084. Additionally, Hybrid Log-Gamma (HLG) HDR content generator 52B may generate HLG HDR content 58B in accordance with the Association of Radio Industries and Business (ARIB) standard STD-B67.

The HDR content generators 54 may include circuitry that is used to generate that HDR content 58. As illustrated, the HDR content generators include processing circuitry 60 that is communicatively coupled to storage or memory 62. The processing circuitry 60 may include one or more general purpose microprocessors, one or more application specific processors (ASICs), one or more field programmable logic arrays (FPGAs), or any combination thereof. The processing circuitry 60 may execute instructions stored on the memory 62, to generate the HDR content 58. For example, processing circuitry 60A of the PQ HDR content generator 54A may utilize instructions stored on memory 62A to generate the PQ HDR content 58A. Similarly, processing circuitry 60B of the HLG HDR content generator 54B may utilize instructions stored on memory 62B to generate the HLG HDR content 58B. More particularly, the instructions executed by the processing circuitry 60A and the processing circuitry 60B may respectively include transfer functions associated with the PQ and HLG standards.

Additionally, it should be noted that the content 56 may be HDR content when the content sources 52 capture content in an HDR format. In such a case, the HDR content generators 54 may nevertheless modify the content 56, for example, as the content 56 would be modified for display on a television, tablet, cell phone, or other electronic device. That is, the content 56 may be modified in accordance with HLG standards and PQ standards.

The waveform monitor 14, which, in some embodiments, is communicatively coupled to the HDR content generators 54, may receive the HDR content 58 from the HDR content generators 54, process the HDR content, and generate HDR adjusted monitoring output 66. The waveform monitor 14 may include various circuitry utilized to perform these functions. For example, the waveform monitor 14 includes processing circuitry 68 that is utilized to process data received and generated by the waveform monitor 14. For instance, the processing circuitry 68 may be communicatively coupled to memory 70 and non-volatile storage 72 to perform various programs or algorithms, such as a program 74 stored on the storage 72. Such programs or instructions executed by the processing circuitry 68 may be stored in any suitable article of manufacture that includes one or more tangible, computer-readable media at least collectively storing the instructions or routines, such as the memory 70 and the storage 72. The memory 70 and the storage 72 may include any suitable articles of manufacture for storing data and executable instructions, such as random-access memory, read-only memory, rewritable flash memory, hard drives, and optical discs. In addition, programs encoded on such a computer program product may also include instructions that may be executed by the processing circuitry 68 to enable the waveform monitor 14 to perform the techniques described herein. For example, the processing circuitry 68 may execute the program 74 to receive the HDR content 58 from the HDR content generators 54. Moreover, the processing circuitry 68 may execute the program 74 to process the HDR content 58 and generate the HDR adjusted monitoring output 66. Furthermore, the processing circuitry 68 is communicatively coupled to the display 12, and the processing circuitry 68 may cause the HDR adjusted monitoring output 66 to be presented on the display 12. Additionally, it should be noted that the processing circuitry 30 may include one or more general purpose microprocessors, one or more application specific processors (ASICs), one or more field programmable logic arrays (FPGAs), or any combination thereof.

In some embodiments, the HDR content generators 54 may be included in the waveform monitor 14. For example, the program 74 may include instructions stored on the memory 62, and the processing circuitry 68 of the waveform monitor may execute the instructions of the program 74 to generate the HDR content 58 as well as analyze the HDR content 58 (e.g., to produce the HDR adjusted monitoring output 66). In other words, the waveform monitor 14 may be capable of performing the functions described as being completed by the HDR content generators 54. Accordingly, in some embodiments, the content monitoring system 50 may not include the HDR content generators 54.

Additionally, it should be noted that while two HDR content generators 54 are depicted in FIG. 2, fewer than two HDR content generators 54 may be included in the content monitoring system 50. For example, a single electronic device may function as both the PQ HDR content generator 54A and the HLG HDR content generator 54B. Alternatively, only one of the PQ HDR content generator 54A and the HLG HDR content generator 54B may be included in the content monitoring system 50. Furthermore, in other embodiments, more than two HDR content generators may be included in the content monitoring system 50.

As noted above, the storage 72 may include a program 74 that includes instructions that the processing circuitry 68 executes to generate the HDR adjusted monitoring output 66. The HDR adjusted monitoring output 66 may, for example, be the waveform 10C of FIG. 1. Accordingly, the waveform monitor 14 may utilize the program 74 to process video signals (e.g., signals representing the HDR content 58) and generate a normalized graphical representation of HDR video signals. As discussed below, the program 74 may include various algorithms that may be applied to the HDR content 58 to generate the HDR adjusted monitoring output 66.

Furthermore, while the content monitoring system 50 is described as including the waveform monitor 14, in other embodiments, another electronic device may be used as an alternative to the waveform monitor 14. For example, a computer capable of executing the program 74 to process the HDR content 58, generate the HDR adjusted monitoring output 66, and cause the HDR adjusted monitoring output 66 to be displayed may be used.

Figure 3:
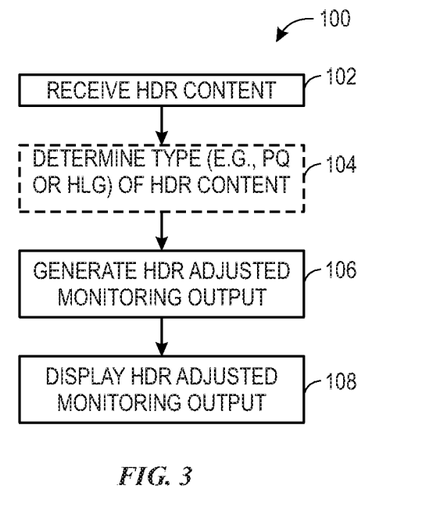
FIG. 3 is a flow diagram illustrating a process for providing an HDR adjusted monitoring output, in accordance with an embodiment of the present disclosure.

Keeping the discussion of FIG. 2 in mind, FIG. 3 is a flow diagram of a process 100 for generating the HDR adjusted monitoring output 66. The process 100 may be performed by the processing circuitry 68 of the waveform monitor 14 by executing the program 74. Additionally, while the process 100 is described below as including several operations, in some embodiments, some of the operations may be omitted.

At process block 102, the processing circuitry 68 may receive HDR content 58 (e.g., from the HDR content generators 54). In other embodiments, the processing circuitry 68 may receive the HDR content 54 directly from the content source 52, such as when the content 56 is HDR content.

At process block 104, the processing circuitry 68 may determine a type of the HDR content 58. For example, the processing circuitry 68 may determine under which standard the HDR content 58 was generated. In other words, the processing circuitry 68 may determine whether the HDR content 58 is PQ HDR content 58A or HLG HDR content 58B. The processing circuitry 68 may determine which type of content the HDR content 58 is based on characteristics of the HDR content 58, such as colors or brightness levels indicated by the HDR content 58 or metadata included in the HDR content 58 (e.g., metadata indicating that particular HDR content 58 is PQ HDR content 58A or HLG HDR content 58B.)

At process block 106, the processing circuitry 68 may generate the HDR adjusted monitoring output 66. For instance, as described above, the processing circuitry 68 may generate the HDR adjusted monitoring output 66 by executing the program 74. In particular, the program 74 may include different sets of instructions (e.g., algorithms) that are utilized for different types of HDR content. For example, the processing circuitry 68 may utilize one portion of instructions included in the program 74 when processing the PQ HDR content 58A and utilize another portion of instructions included in the program 74 when processing the HLG HDR content 58B. As discussed below, various portions of a video signal (e.g., HDR content 58 received by the waveform monitor 14) may be stretched and compressed or values of the HDR content 58 may be mapped to adjusted values in order to generate a uniform (or adjusted) representation (e.g., HDR adjusted monitoring output 66) of the HDR content 58 regardless of whether the HDR content 58 is PQ HDR content 58A or HLG HDR content 58B.

Figure 4:
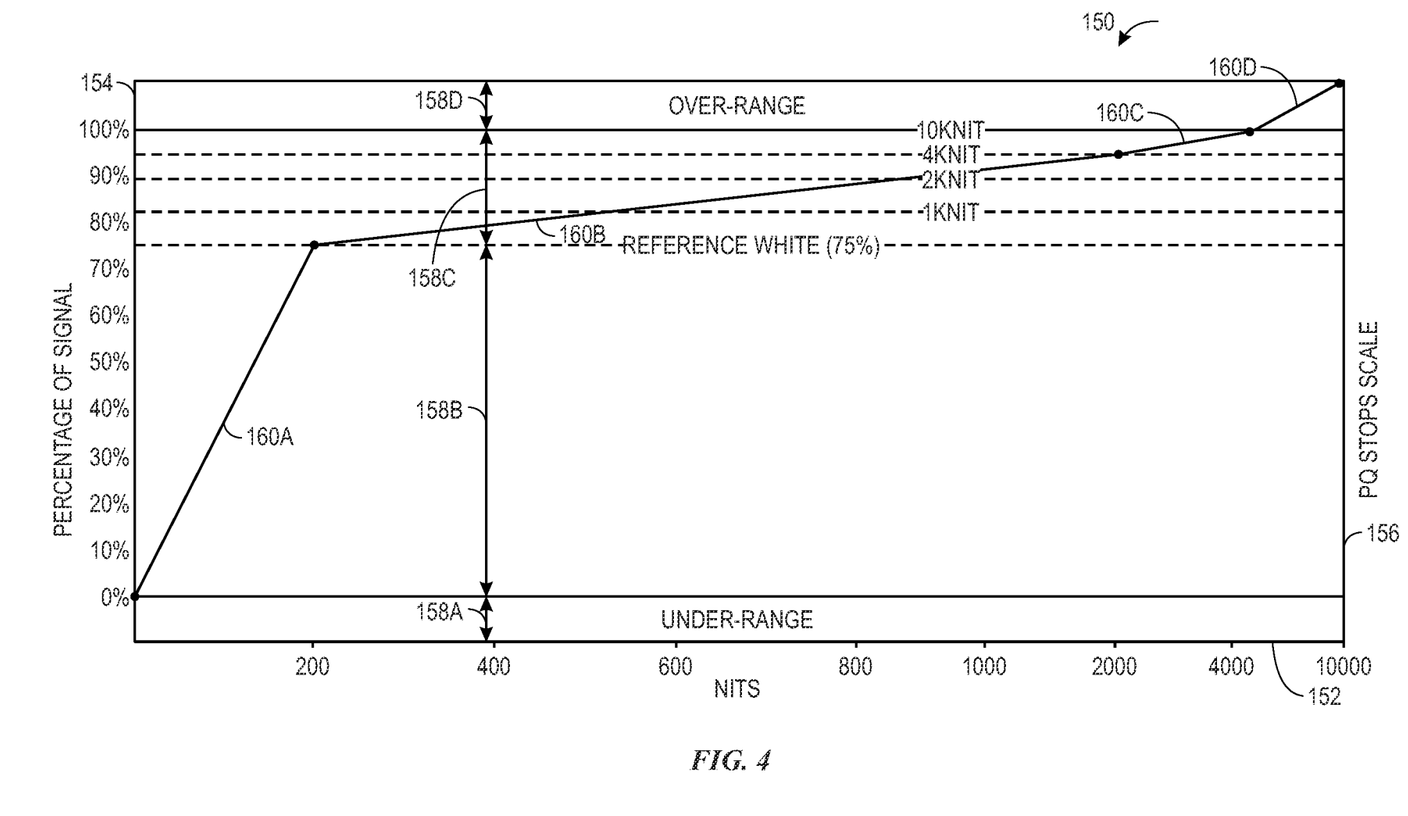
FIG. 4 is a graph illustrating normalization of hybrid log-gamma (HLG) HDR content, in accordance with an embodiment of the present disclosure.

To help illustrate an example of how the waveform monitor 14 may generate the HDR adjusted monitoring output 66 from PQ HDR content 58A, the PQ HDR content 58A will be discussed in more detail with respect to FIG. 4. In particular, FIG. 4 is a graph 150 illustrating normalization of a video signal such as video signal for the PQ HDR content 58A. The graph 150 includes a first axis 152 indicative of brightness in nits, a second axis 154 indicative of a percentage of the signal for PQ HDR content 58A, and a third axis 156 indicative of stops on the PQ stops scale. The number of stops included in image or video content (e.g., content 56 or HDR content 58) describes the level of contrast in the content. For example, for content having 6 to 7 stops, such as SDR content, white may appear 64 to 128 (i.e., 26 to 27) times brighter than the darkest black. HDR content such as the PQ HDR content 58A and HLGHDR content 58B may be associated with more stops that SDR content. For instance, as indicated by the third axis 156, the PQ HDR content 58A may be associated with approximately 13.3 stops. This means that the brightest white in the PQ HDR content 58A may be approximately 10,000 (i.e., approximately 213.3) times brighter than the darkest black (which corresponds to the first axis ranging from 0 to 10,000 nits).

The graph 150 includes various regions 158 associated with various color or brightness ranges that may be found in the PQ HDR content 58A. For example, the graph 150 includes an under-range region 158A, a diffuse/graphic white region 158B, a highlight or specular range region 158C, and an over-range region 158D. The regions 158 may be associated with different portions of a video signal (e.g., HDR content 58), brightness ranges within content in the video signal, and stops. These relationships are depicted by the lines 160. For example, for an incoming video signal (e.g., a signal for the HDR content 58), line 160A indicates that approximately seventy-five percent of an HDR normalized signal (e.g., generated by the waveform monitor 14 in response to the HDR content 58) is associated with the diffuse/graphic white region 158B (which includes diffuse white and/or graphic white), a brightness range of 0 to 203 nits, and a range of approximately 7.6 f-stops. Lines 160B and 160C indicate that approximately 25% of the HDR normalized signal will be associated with the highlight or specular range region 158C, a brightness range of 203 to approximately 4000 nits, and approximately 5.7 f-stops.

The over-range region 158D is associated with HDR content that may currently have a brightness that is greater than the highest brightness associated with a standard. For example, in the graph 150, the over-range region 158D may be associated with content having a brightness that is greater than the 10,000 nit brightness associated with PQ HDR content. Accordingly, because the maximum brightness associated with over-range content may be greater than the maximum brightness of standardized PQ HDR content, the signal may be said to be greater than one-hundred percent in total, where the content included in the range from zero to one-hundred percent includes the content (e.g., HDR content) that is displayable under current PQ HDR standards. Accordingly, line 160D indicates that some of the HDR normalized signal (e.g., a signal generated by the waveform monitor 14 based on the HDR content 58) may be associated with the over-range region 158D and a brightness range of approximately 4,000 to 10,000 nits.

Figure 5:
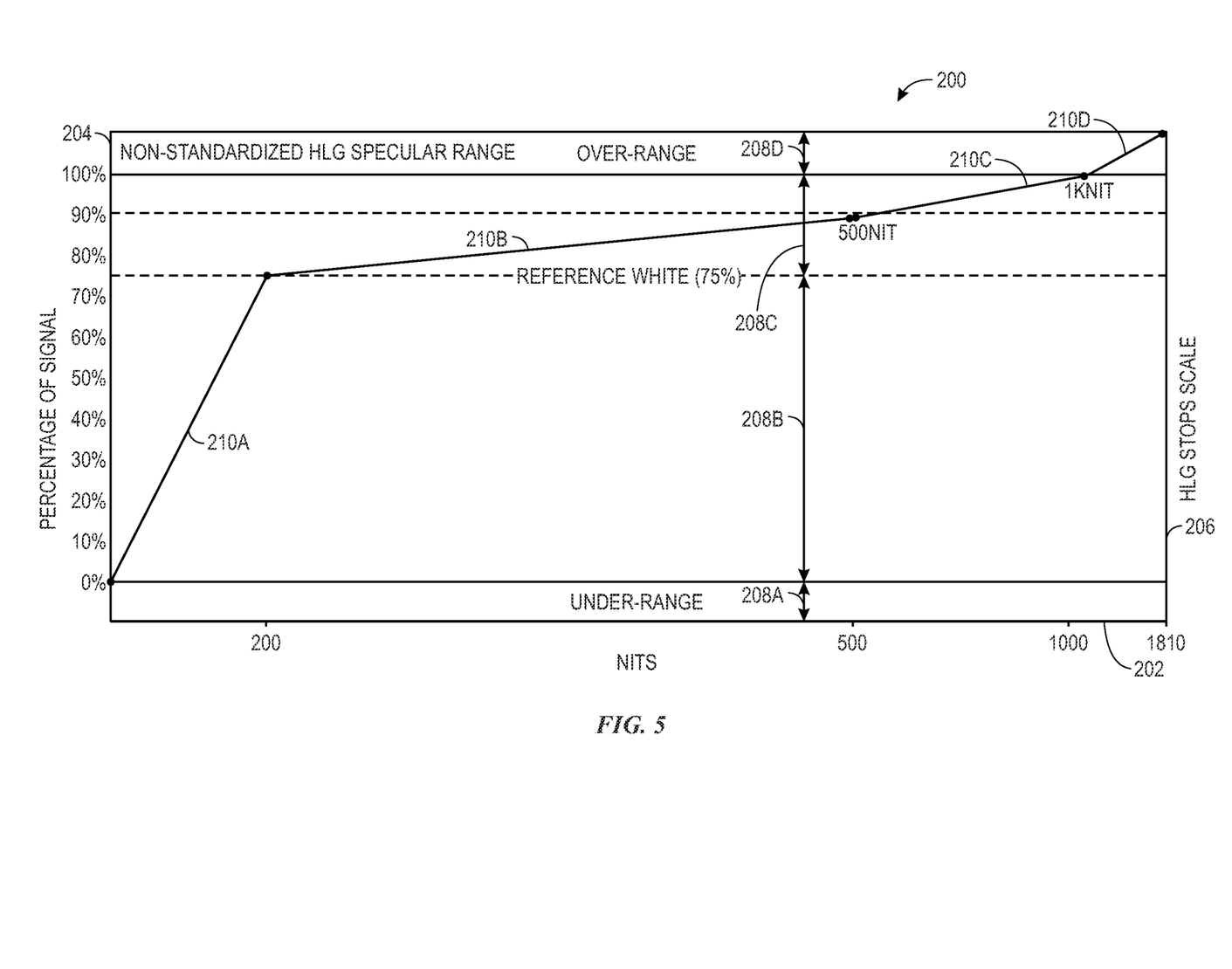
FIG. 5 is a graph illustrating normalization of Perceptual Quantizer (PQ) HDR content, in accordance with an embodiment of the present disclosure.

To help illustrate how the waveform monitor 14 may generate the HDR adjusted monitoring output 66 from HLG HDR content 58B, the HLG HDR content 58B will be discussed in more detail with respect to FIG. 5. In particular, FIG. 5 is a graph 200 illustrating normalization of a video signal such as video signal for the HLG HDR content 58B. The graph 200 includes a first axis 202 indicative of brightness in nits, a second axis 204 indicative of a percentage of the signal for HLG HDR content 58B, and a third axis 206 indicative of stops on the HLG stops scale. As indicated by the third axis 206, the HLG HDR content 58B may be associated with approximately 10.44 stops. This means that the brightest white in the HLG HDR content 58B may be approximately 1,810 (i.e., approximately 210.82) times brighter than the darkest black (which corresponds to the first axis ranging from 0 to 1,866 nits).

The graph 200 includes various regions 208 associated with various color or brightness ranges that may be found in the HLG HDR content 58B. For example, the graph 200 includes an under-range region 208A, a diffuse/graphic white region 208B, a highlight range region 208C, and an over-range region 208D. The regions 208 may be associated with different portions of a video signal (e.g., HDR content 58), brightness ranges within content in the video signal, and stops. These relationships are depicted by the lines 210. For example, for a video signal (e.g., a signal for the HDR content 58), line 210A indicates that approximately seventy-five percent of an HDR normalized signal (e.g., generated by the waveform monitor 14 in response to the HDR content 58) is associated with the diffuse/graphic white region 208B (which includes diffuse white and/or graphic white), a brightness range of 0 to 203 nits, and a range of approximately 7.6. Lines 210B and 210C indicate that approximately 25% of the HDR normalized signal will be associated with the highlight range region 208C, a brightness range of 203 to 1000 nits, and approximately 2.4.

The over-range region 208D is associated with HDR content that may currently have a brightness that is greater than the highest brightness associated with a HLG standardized content. For example, the over-range region 208D may be associated with content having a brightness that is greater than the 1,866 nit brightness associated with HLG standardized HDR content. Accordingly, because the maximum brightness associated with over-range content may be greater than the maximum brightness of standardized HLG HDR content, the signal may be said to be greater than one-hundred percent in total, where the content included in the range from zero to one-hundred percent includes the content (e.g., HDR content) that is displayable under current HLG HDR standards. Accordingly, line 210D indicates that some of the signal (e.g., HLGHDR content 58B) may be associated with the over-range region 208D and a brightness range of approximately 1,000 to 1,866 nits.

As discussed above with respect to the waveform 10B of FIG. 1, because HDR content (e.g., HDR content 58) has a larger range of brightness than SDR content, the waveform monitor 14 may produce waveforms similar to the waveform 10B, especially if the waveforms are not normalized based on the nits range (or another brightness range) and on the percentage of the signal to which the nits range corresponds. In other words, when a waveform representative of HDR content is equally distributed along the vertical axis 16 (e.g., not normalized), the waveform may appear compressed. Furthermore, because the PQ HDR content 58A and HLG HDR content 58B are associated with different brightness ranges, waveforms for the PQ HDR content 58A and HLG HDR content 58B may differ. As discussed below, the processing circuitry 68 may use the program 74 to generate the HDR adjusted monitoring output 66, which is not only uniform (or normalized) for both PQ HDR content 58A and HLG HDR content 58B, but also similarly visible and interpretable (e.g., as depicted by waveform 10C in FIG. 1).

As indicated by Table 1 and Table 2, for a signal including the HDR content 58, the processing circuitry 68 may execute the program 74 to modify/map the signal (or adjust waveform monitor 14 output values) so that equal (or corresponding) amounts of the resulting output signal are associated with the same regions (e.g., regions 158 and 208). In other words, the processing circuitry 68 may normalize the PQ HDR content 58A and the HLG HDR content 58B so that the resulting output for any received HDR content 58 is uniform. For example, approximately 75% of the resulting signal (the HDR adjusted monitoring output 66) is associated with the diffuse/graphic white regions 158B, 208B, approximately 25% of the resulting signal is associated with the specular or highlight range region 158C and the highlight range region 208C, and approximately 10% of the resulting signal is associated with the over-range regions 158D, 208D. In other words, processing circuitry 68 may expand portions of the HDR content 58 associated with diffuse/graphic white regions 158B, 208B (e.g., from approximately 58% to approximately 75% of an HDR video signal), compress portions of the PQ HDR content 58A associated with the specular or highlight range region 158C and portions of the HLG HDR content 58B associated with the specular or highlight range region 208C the highlight range region 208C (e.g., from approximately 32% to approximately 25% of an HDR video signal), and modify portions of the HDR content 58 associated with the over-range regions 158D, 208D (e.g., to approximately 10% of an HDR video signal).

TABLE 1

PQ HDR Content Normalization

| Percent of Signal (e.g., PQ HDR Content 58A) | PQ Ranges (nits) | Corresponding Region |
|---|---|---|
| 75% | 0-203 | Diffuse/Graphic White Region 158B |
| 25% | 203-1,000 1,000-4,000 | Specular or Highlight Range Region 158C |
| 10% | 4,000-10,000 | Over-Range Region 158D |

TABLE 2

HLG HDR Content Normalization

| Percent of Signal (e.g., HLG HDR Content 58B) | HLG Ranges (nits) | Corresponding Region |
|---|---|---|
| 75% | 0-203 | Diffuse/Graphic White Region 208B |
| 25% | 203-1,000 | Highlight Range Region 208C |
| 10% | 1,000-1,810 | Over-Range Region 208D |

As indicated by Table 1 and Table 2, for a signal including the HDR content 58, the processing circuitry 68 may execute the program 74 to modify/map the signal (or adjust waveform monitor 14 output values) so that equal (or corresponding) amounts of the resulting output signal are associated with the same regions (e.g., regions 158 and 208). In other words, the processing circuitry 68 may normalize the PQ HDR content 58A and the HLG HDR content 58B so that the resulting output for any received HDR content 58 is uniform. For example, approximately 58% of the resulting signal (the HDR adjusted monitoring output 66) is associated with the diffuse-graphic white regions 158B, 208B, approximately 32% of the resulting signal is associated with the specular or highlight range region 158C and the highlight range region 208C, and approximately 10% of the resulting signal is associated with the over-range regions 158D, 208D. In other words, processing circuitry 68 may compress portions of the HDR content 58 associated with diffuse-graphic white regions 158B, 208B (e.g., from approximately 75% to approximately 58% of an HDR video signal), expand portions of the PQ HDR content 58A associated with the specular or highlight range region 158C and portions of the HLG HDR content 58B associated with the specular or highlight range region 208C the highlight range region 208C (e.g., from approximately 25% to approximately 32% of an HDR video signal), and expand portions of the HDR content 58 associated with the over-range regions 158D, 208D (e.g., from 0% (due to not being displayable) to approximately 10% of an HDR video signal).

By normalizing the HDR content 58 so that various portions of the HDR content 58 (e.g., portions associated with regions 158, 208) form the percentages of HDR video signals indicated in Table 1 and Table 2, the waveform monitor 14 may produce the HDR adjusted monitoring output 66, which may be graphically represented as the waveform 10C of FIG. 1. With this in mind, returning to FIG. 3 and the discussion of the process 100, at process block 108, the processing circuitry 68 may cause the HDR adjusted monitoring output 66 to be displayed. For example, the processing circuitry 68 may cause the HDR adjusted monitoring output 66 to be displayed via the display 12 as the waveform 10C.

Referring to FIG. 1, the waveform 10C is a normalized graphical representation of the HDR content 58 that the waveform monitor 14 may generate for both the PQ HDR content 58A and the HLG HDR content 58B. More specifically, the waveform 10C may be a graphical representation of a modified HDR content signal generated by the waveform monitor 14. For instance, as described above, the waveform monitor 14 may receive a signal indicative of the HDR content 58, modify the signal, and generate the HDR adjusted monitoring output 66 based on the modified signal. In such a case, the HDR adjusted monitoring output 66 may be the waveform 10C.

Different portions of modified HDR signals may be displayed in different portions of the display 12. For example, a portion of a graphical representation (e.g., waveform 10C) of the HDR content 58 associated with the diffuse/graphic white regions 158B, 208B may be displayed in the portion 24 of the display 12. Another portion of the graphical representation (e.g., waveform 10C) of the HDR content 58 associated with the highlight range region 208C and specular or highlight range region 158C may be displayed in the portion 26 of the display 12. Moreover, another portion of the graphical representation (e.g., waveform 10C) of the HDR content 58 associated with the over-range regions 158D, 208D may be displayed in the portion 28 of the display 12. In other words, the instructions of the program 74, when executed, may cause the processing circuitry 68 of the waveform monitor 14 to display the various portions of the HDR content 58 (e.g., portions of the HDR content 58 corresponding to regions 158, 208) in different parts of the display 12 (e.g., portions 24, 26, 28). Because each of the regions 158, 208 of the HDR content 58 is also associated with various luminance ranges and stops, the portions 24, 26, 28 are also associated with the luminance ranges and stops. Thus, based on where the waveform 10C exists when displayed, the waveform 10C may be indicative of color or brightness values associated with different types of HDR content 58. Furthermore, because the waveform 10C is a normalized graphical representation of PQ HDR content 58A and HLG HDR content 58B, engineers and technicians may interpret the waveform 10C without defining the regions 158, 208 and/or taking into consideration whether the HDR content 58 represented by the waveform 10C is PQ HDR content 58A or HLG HDR content 58B.

In some instances, when the HDR content 58 is in a region corresponding to a higher luminance range (e.g., greater than 1000 nits or some other threshold), the HDR content 58 has the potential to appear uncomfortable to a viewer because the HDR content 58 may be perceived to be too "loud" or too bright for some viewers. As such, the system as described may be configured to provide an indicator or overlay (e.g., a zebra or another pattern) for a portion of the HDR content 58 that may be of concern. This identification may be based on one or more factors (or conditions) of which brightness or luminance is one of them. Other factors may include color, raster size, and duration. Regarding color—according to at least one embodiment, it is recognized that the human eye typically views certain colors as attracting more attention than other colors. For example, certain colors (e.g., white, yellow, green and red) may typically attract more attention than other colors (e.g., blue). By way of example, a red object that is displayed at a particular brightness level (e.g., 900 nits) might be perceived as being more distracting (or annoying, or offensively bright) than a blue object that is displayed at the same brightness level. Regarding raster size— according to at least one embodiment, it is recognized that the human eye typically views an object that is of at least a particular size as attracting more attention than an object of a lesser size. For example, a displayed object having a size that equals or exceeds a raster size (e.g., an object occupying at least a threshold percentage of the display screen) may tend to attract more attention than a displayed object having a smaller size. Regarding duration—according to at least one embodiment, it is recognized that objects that are displayed for longer than a threshold duration of time may be perceived as an annoyance. By way of example, an object that is displayed at a brightness level (e.g., 1,000 nits) for over a threshold duration might be perceived as being more distracting (or annoying, or offensively bright) than another object that is displayed at the same brightness level but for a shorter duration that is less than the threshold. As such, a portion of the HDR content 58 may be classified as of concern based on a combination of factors that may include one or more of brightness, color, raster size, and duration, and areas classified as of concern may be overlaid with an indicator to flag that area so that a content provider or distributor may make the appropriate corrections before the HDR content 58 is provided to viewers.

Furthermore, it should be noted that the brightness of portions of the waveforms generated by the waveform monitor 14 may vary to reflect differences in content represented by the waveforms. For example, portions of the waveform 10C may be illuminated at different brightness levels to indicate differences in brightness in the HDR content 58. More specifically, in some cases, different portions within the waveform 10C may have different brightness levels to represent different gain factors associated with different portions of the HDR content 58 that have different amounts of brightness. As another example, in some embodiments, the waveform 10C may only represent certain portions of the HDR content 58 having certain brightness levels, and different parts of the waveform 10C may be represented with different amounts of brightness to indicate that other portions of the HDR content 58 include brightness levels different from those represented by the waveform 10C. That is, the vertical axis 16 may be used to only indicate a portion of the brightness levels included in the HDR content 58, and the waveform 10C may include different brightness levels to indicate when the HDR content 58 includes content with brightness levels exceeding those represented along the vertical axis 16. For instance, the waveform 10C may be representative of portions of the HDR content 58 in the diffuse/graphic white region 158B for PQ HDR content 58A or the diffuse/graphic white region 208B for HLG HDR content 58B, in which case the waveform 10C may include different brightness levels to indicate when the HDR content 58 includes brightness levels that are in the specular or highlight range region 158C or over-range region 158D (for PQ HDR content 58A) or in the highlight range region 208C or over-range region 208D (for HLG HDR content 58B). As yet another example, the waveform 10C may be representative of HDR content 58 in the diffuse/graphic white region 158B and specular or highlight range region 158C for PQ HDR content 58A or the diffuse/graphic white region 208B and highlight range region 208C for HLG HDR content 58B. In this example, different brightness levels may be depicted in the waveform 10C to represent when portions of the HDR content 58 are in the over-range region 158D (for PQ HDR content 58A) or in the over-range region 208D (for HLG HDR content 58B). Furthermore, it should be noted that different brightness levels may also be used to represent when the HDR content 58 includes brightness levels in the under-range region 158A (for PQ HDR content 58A) or in the under-range region 208A (for HLG HDR content 58B).

Accordingly, the presently disclosed techniques enable the generation and display of standard-independent normalized graphical representations of HDR content, such as waveforms that are displayed on waveform monitors. As discussed above, these techniques also enable the waveforms to be generated without a user defining portions (e.g., ranges) within the content, thereby reducing or eliminating the human subjectivity that occurs when several users utilize different settings or define portions of the content differently.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A tangible, non-transitory machine-readable medium comprising machine-readable instructions that, when executed by processing circuitry, cause the processing circuitry to:
receive a signal indicative of high dynamic range (HDR) content, wherein the signal comprises:
a first portion associated with a first brightness range and forming a first percentage of the signal; and
a second portion associated with a second brightness range and forming a second percentage of the signal;
generate, utilizing a transfer function or a lookup table, an adjusted signal to represent the signal by increasing the first percentage and decreasing the second percentage such that a waveform of the adjusted signal comprises an area corresponding to the first portion of the signal, wherein the area is expanded relative to a corresponding area in a waveform of the signal; and
cause graphical display of the waveform of the adjusted signal.

2. The tangible, non-transitory machine-readable medium of claim 1, wherein the instructions, when executed, are configured to cause the processing circuitry to:
determine a type of the HDR content; and
generate the adjusted signal based on the determined type of the HDR content.

3. The tangible, non-transitory machine-readable medium of claim 2, wherein:
the type of the HDR content comprises Perceptual Quantizer HDR content or Hybrid Log-Gamma HDR content.

4. The tangible, non-transitory machine readable medium of claim 1, wherein:
the first brightness range is associated with diffuse/graphic white content; and
the second brightness range is associated with specular or highlight range content.

5. The tangible, non-transitory machine-readable medium of claim 4, wherein the signal comprises a third portion associated with a third brightness range associated with over-range content, wherein the third portion forms a third percentage of the signal.

6. The tangible, non-transitory machine-readable medium of claim 5, wherein after the signal is modified, a sum of the first percentage, second percentage, and third percentage is one-hundred percent.

7. The tangible, non-transitory machine-readable medium of claim 1, wherein the instructions, when executed, are configured to cause the processing circuitry to cause graphical display of the waveform of the adjusted signal in lieu of the waveform of the signal.

8. A machine-implemented method for generating a high dynamic range (HDR) adjusted monitoring output, the method comprising:
receiving, via processing circuitry, a signal indicative of high dynamic range (HDR) content, wherein the signal comprises:
a first portion associated with a first brightness range and forming a first percentage of the signal; and
a second portion associated with a second brightness range and forming a second percentage of the signal;
generating, via the processing circuitry, an adjusted signal to represent the signal by utilizing a transfer function or a lookup table to increase the first percentage and decrease the second percentage such that a waveform of the adjusted signal comprises an area corresponding to the first portion of the signal, wherein the area is expanded relative to a corresponding area of a waveform of the signal; and
cause, via the processing circuitry, graphical display of the waveform of the adjusted signal.

9. The method of claim 8, comprising generating the adjusted signal utilizing the lookup table, wherein the lookup table defines one or more output values associated with one or more input values of the HDR content.

10. The method of claim 8, comprising:
determining whether the HDR content comprises Perceptual Quantizer (PQ) HDR content or Hybrid Log-Gamma (HLG) HDR content based on metadata included in the HDR content, brightness levels indicated by the HDR content, or both; and
producing the adjusted signal by modifying the signal based on determining whether the HDR content comprises PQ HDR content or HLG HDR content.

11. The method of claim 8, wherein the first brightness range ranges from approximately 0 to 203 nits.

12. The method of claim 8, wherein producing the adjusted signal comprises modifying the signal by:
adjusting the first percentage to a first adjusted percentage; and
adjusting the second percentage to a second adjusted percentage that is less than the first percentage.

13. The method of claim 12, wherein a sum of the first adjusted percentage, second adjusted percentage, and a third percentage associated with a portion of over-range content sums to one-hundred percent of the adjusted signal.

14. The method of claim 8, wherein the adjusted signal is normalized for Perceptual Quantizer normalized HDR content and Hybrid Log-Gamma normalized HDR content.

15. A content monitoring system, comprising:
an electronic device comprising:
a display;
a non-transitory computer-readable storage medium comprising instructions;
processing circuitry communicatively coupled to the non-transitory storage medium and the display, wherein the processing circuitry is configured to execute the instructions to:
receive a signal indicative of high dynamic range (HDR) content, wherein the signal comprises:
a first portion associated with a first brightness range and forming a first percentage of the signal; and
a second portion associated with a second brightness range and forming a second percentage of the signal;
generate, utilizing a transfer function or a lookup table, an adjusted signal to represent the signal by increasing the first percentage and decreasing the second percentage such that a waveform of the adjusted signal comprises an area corresponding to the first portion of the signal, wherein the area is expanded relative to a corresponding area of a waveform of the signal; and
cause graphical display of the waveform of the adjusted signal.

16. The content monitoring system of claim 15, comprising one or more HDR content generators communicatively coupled to the electronic device, wherein the one or more HDR content generators are configured to generate the HDR content and provide the HDR content to the electronic device.

17. The content monitoring system of claim 16, comprising one or more content sources communicatively coupled to the one or more HDR content generators, wherein:
   the one or more content sources are configured to capture content, store content, or both; and
   the one or more HDR content generators are configured to receive the content from the one or more content sources and generate the HDR content based on the content.

18. The content monitoring system of claim 15, wherein the electronic device comprises a waveform monitor.

19. The content monitoring system of claim 15, wherein the HDR content comprises Perceptual Quantizer standardized HDR content or Hybrid Log-Gamma standardized HDR content.

20. The tangible, non-transitory machine-readable medium of claim 1, wherein the adjusted signal is normalized for Perceptual Quantizer normalized HDR content and Hybrid Log-Gamma normalized HDR content.

* * * * *